(12) United States Patent
Cho

(10) Patent No.: US 11,592,084 B2
(45) Date of Patent: Feb. 28, 2023

(54) SHEAVE OR SPROCKET TENSION ADJUSTMENT AND ALIGNMENT TOOL

(71) Applicant: Benson Yuk Cho, San Francisco, CA (US)

(72) Inventor: Benson Yuk Cho, San Francisco, CA (US)

( * ) Notice: Subject to any disclaimer, the term of this patent is extended or adjusted under 35 U.S.C. 154(b) by 446 days.

(21) Appl. No.: 16/915,515

(22) Filed: Jun. 29, 2020

(65) Prior Publication Data
US 2021/0404538 A1   Dec. 30, 2021

(51) Int. Cl.
| | |
|---|---|
| *F16H 7/12* | (2006.01) |
| *F16H 7/14* | (2006.01) |
| *F16H 7/10* | (2006.01) |
| *F16H 7/02* | (2006.01) |
| *F16H 7/08* | (2006.01) |
| *F16H 7/06* | (2006.01) |
| *F16H 7/16* | (2006.01) |

(52) U.S. Cl.
CPC ............. *F16H 7/1254* (2013.01); *F16H 7/10* (2013.01); *F16H 7/1263* (2013.01); *F16H 7/14* (2013.01); *F16H 7/02* (2013.01); *F16H 7/06* (2013.01); *F16H 7/16* (2013.01); *F16H 2007/087* (2013.01); *F16H 2007/088* (2013.01); *F16H 2007/0861* (2013.01); *F16H 2007/0865* (2013.01); *F16H 2007/0876* (2013.01); *F16H 2007/0891* (2013.01)

(58) Field of Classification Search
CPC ..... F16H 7/00; F16H 7/02; F16H 7/06; F16H 7/08; F16H 2007/0802; F16H 2007/0825; F16H 2007/0842; F16H 2007/0844; F16H 2007/0861; F16H 2007/0863; F16H 2007/0865; F16H 2007/087; F16H 2007/0876; F16H 2007/088; F16H 7/10; F16H 7/12; F16H 7/1254; F16H 7/1263; F16H 7/1272; F16H 7/1281; F16H 7/129; F16H 7/14; F16H 7/16; F16H 2007/0891; F16H 2007/0893

See application file for complete search history.

(56) References Cited

U.S. PATENT DOCUMENTS

| | | | | |
|---|---|---|---|---|
| 2,646,951 A | * | 7/1953 | Sloyan | ........... H02K 5/26 248/655 |
| 2,762,661 A | * | 9/1956 | Sloyan | ........... F16H 7/14 384/7 |
| 2,833,597 A | * | 5/1958 | Sloyan | ........... F16H 7/14 248/657 |

(Continued)

*Primary Examiner* — Michael R Mansen
*Assistant Examiner* — Raveen J Dias
(74) *Attorney, Agent, or Firm* — Workman Nydegger

(57) ABSTRACT

A sheave/sprocket tension adjustment and alignment tool (STAT) for adjusting alignment between a sheave/sprocket of a motor and a sheave/sprocket of an application machine includes a plate, a securing unit, and an adjusting unit. The plate has a first side and a second side, each of which is an opposite side of a plane of the plate. The securing unit is coupled to the first side of the plate and is configured to protrude in a first direction from the first side of the plate. The adjusting unit is coupled to a second side of the plate. The adjusting unit includes an adjustable protrusion that is configured to adjustably protrude in a second direction, which is substantially parallel to the plane of the plate.

20 Claims, 13 Drawing Sheets

(56) References Cited

U.S. PATENT DOCUMENTS

| | | | | |
|---|---|---|---|---|
| 2,833,598 A * | 5/1958 | Sloyan | | F16C 33/306 384/49 |
| 2,874,006 A * | 2/1959 | Sloyan | | F16H 7/14 384/29 |
| 3,066,898 A * | 12/1962 | Haynes | | F16M 7/00 248/656 |
| 3,168,835 A * | 2/1965 | Nuss, Jr. | | F16M 7/00 411/119 |
| 4,012,021 A * | 3/1977 | Duceppe | | H02K 5/26 310/91 |
| 4,120,210 A * | 10/1978 | Sloyan | | F16M 7/00 248/657 |
| 4,561,624 A * | 12/1985 | Freeman | | F16H 7/14 248/149 |
| 4,631,044 A * | 12/1986 | Redmon | | F16H 7/14 248/656 |
| 5,975,480 A * | 11/1999 | Schaefer | | F16M 7/00 248/657 |
| 6,450,782 B1 * | 9/2002 | Sakamoto | | F04C 23/00 248/678 |
| 7,338,400 B2 * | 3/2008 | Pierjok | | F16H 7/14 417/362 |
| 7,891,210 B2 * | 2/2011 | Dubensky | | F16H 7/14 62/419 |
| 7,927,081 B2 * | 4/2011 | MacNeil | | F04B 17/03 417/423.15 |
| 8,721,479 B2 * | 5/2014 | Hoeting | | F16H 7/14 192/56.1 |
| 9,739,349 B2 * | 8/2017 | Gergis | | F16H 7/08 |
| 9,973,056 B2 * | 5/2018 | Copanas | | H02K 5/26 |
| 10,465,836 B2 * | 11/2019 | Copanas | | F16M 7/00 |
| 2005/0037878 A1 * | 2/2005 | Pierjok | | F16H 7/14 474/101 |
| 2009/0191069 A1 * | 7/2009 | Dubensky | | F04D 29/601 417/362 |
| 2011/0165980 A1 * | 7/2011 | Hoeting | | F16H 7/14 254/98 |
| 2011/0237373 A1 * | 9/2011 | Barrios | | F16H 7/14 474/113 |
| 2015/0204425 A1 * | 7/2015 | Lindsay | | F16M 11/2092 474/117 |
| 2015/0280514 A1 * | 10/2015 | Norris | | H02K 5/26 474/115 |
| 2016/0040759 A1 * | 2/2016 | Gergis | | F16H 7/1281 474/101 |
| 2020/0088275 A1 * | 3/2020 | Dong | | F16H 7/1263 |
| 2021/0033172 A1 * | 2/2021 | Chi | | F16H 7/02 |

\* cited by examiner

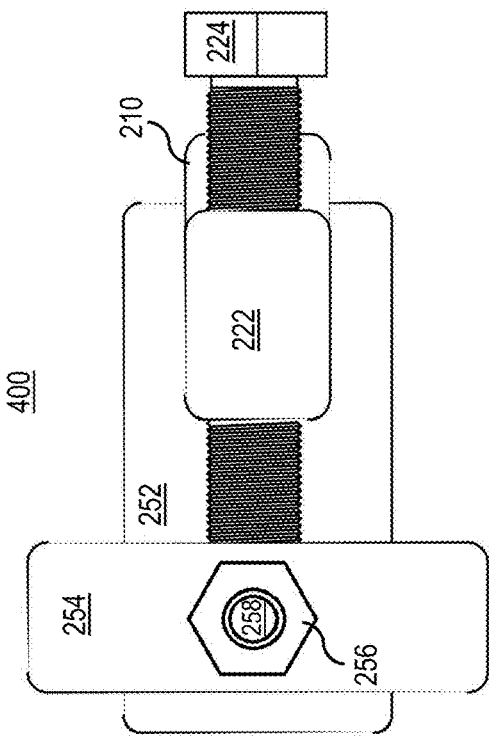
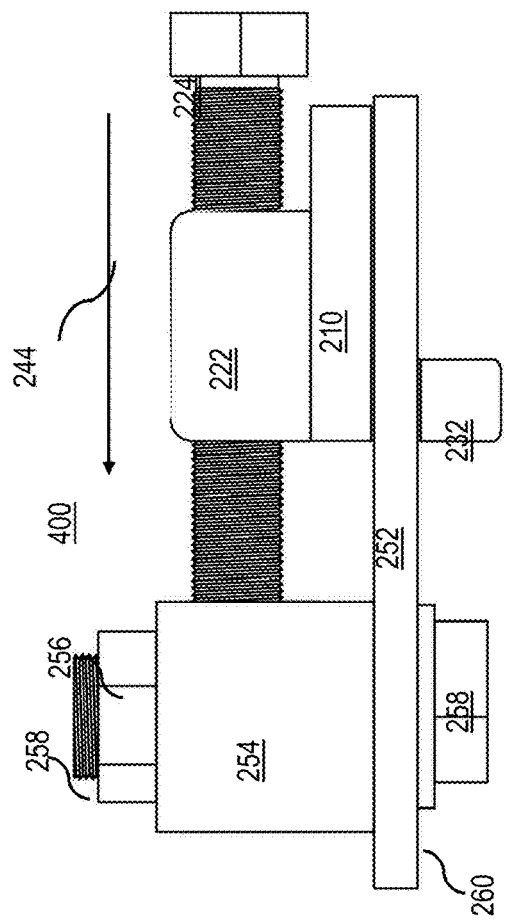
Fig. 4B
Fig. 4A

SHEAVE OR SPROCKET TENSION ADJUSTMENT AND ALIGNMENT TOOL

BACKGROUND

A sheave/sprocket is a pulley wheel that is used for holding a belt, wire rope, and/or a chain. In particular, a sheave is a grooved wheel often used for holding a belt, wire rope, or rope; and a sprocket is a profiled wheel with teeth, or cogs, that mesh with a chain, track or other perforated or indented material. It is often that one sheave/sprocket is coupled to a motor, and another sheave/sprocket is coupled to an application machine. The two sheaves/sprockets are connected via a belt, wire rope, and/or chain, such that power can be transmitted from the motor to the application machine. When the two sheaves/sprockets' shafts are offset and/or not parallel, misalignment occurs. Misalignment can cause one or more of the following undesirable conditions: (1) premature belt or chain failure, (2) uneven and premature sheave/sprocket wear, (3) a high operating temperature or energy consumption, (4) uneven wear on a belt or chain sidewall, (5) belt or chain rolling over in the sheave groove, (6) transfer of load to one side of the belt or chain, (7) increased probability of vibration, and/or (8) drive instability. Thus, when misalignment occurs, alignment adjustment is required.

To adjust the alignment and/or tension of the two sheaves/sprockets, the motor's position is often required to be adjusted. In many cases, a motor includes multiple feet (e.g., four feet at four corners), each of which is fixed onto a motor mount base. Each motor mount base includes a plate having an elongated aperture, along which the corresponding foot is slidably fixed, such that each foot of the motor can be adjusted along the elongated aperture.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a sheave or sprocket tension adjustment and alignment tool (hereinafter also called STAT) that is configured to be attached to a motor mounting base to assist in adjusting tension or alignment of a motor connected by drive belts, wire ropes, and/or chains to an application machine. The STAT may be made in various sizes to fit the size of the motor and the elongated holes of the motor mounting base. For example, a larger STAT is likely to be used to adjust tension or alignment of a larger motor, and a smaller STAT is likely to be used to adjust the tension or alignment of a smaller motor.

A motor includes one or more motor feet. A motor mounting base includes one or more elongated apertures. Each of the one or more elongated apertures has an aperture width and an aperture length. The aperture length is substantially greater than the aperture width. Each of the one or more motor feet is slidably fixed onto the motor mounting base, slidable along one of the one or more elongated apertures.

The STAT includes a plate, a securing unit, and an adjusting unit (also referred to as a first adjusting unit). The plate has a first side and a second side, each of which is on an opposite side of a plane of the plate. The securing unit is coupled to the first side of the plate and protrudes in a first direction from the first side of the plate to be inserted into one of the one or more elongated apertures of the motor mounting base. The first direction intersects the plane of the plate.

The adjusting unit is coupled to the second side of the plate. The adjusting unit has an adjustable protrusion (also referred to as a first adjustable protrusion) that is configured to adjustably protrude in a second direction. The second direction is substantially parallel to the plane of the plate. After the securing unit is inserted into the elongated aperture of the motor mounting base, the adjustable protrusion of the adjusting unit is adjusted to further protrude in the second direction to wedge the STAT between the corresponding motor foot and a first end of the elongated aperture and to apply a force onto the corresponding motor foot to cause the motor foot to move along the elongated aperture toward the second direction.

In some embodiments, the plate has a width that is greater than the aperture width, such that the plate is held against the motor mounting base when the securing unit is inserted into the elongated aperture.

In some embodiments, the securing unit has a neck portion and an end portion. The neck portion connects the plate and the end portion. The neck portion has a diameter or a width that is narrower than the aperture width. The end portion has a wide side and a narrow side. The wide side has a width that is greater than the aperture width, but narrower than the aperture length. The narrow side has a width that is narrower than the aperture width, such that the securing unit is configured to be inserted into the elongated aperture along the wide side of the end portion. When the neck portion is in the elongated aperture, the securing unit is configured to be rotated and secured at a position where the wide side of the end portion intersects the length of the elongated aperture.

In some embodiments, the first adjusting unit includes a receptacle and an insertion unit. The receptacle is configured to receive the insertion unit, and the insertion unit is configured to form the adjustable protrusion in the second direction. In some embodiments, the insertion unit includes a threaded bolt, and the receptacle includes a threaded aperture. The threaded bolt is configured to be screwed into or out of the threaded aperture to adjust the distance of protrusion of an end of the threaded bolt.

In some embodiments, the STAT also includes a second adjustment unit that is coupled to the first side of the plate. The second adjustment unit has a second adjustable protrusion that is configured to adjustably protrude from the first side of the plate. When the securing unit is inserted into the elongated aperture, the second adjustable protrusion is configured to be adjusted to protrude and against the motor mounting base to cause the plate and the first adjustable protrusion to tilt at a proper angle to fit a height of the motor foot.

In some embodiments, the second adjusting unit includes an adjustment screw. The plate has a threaded aperture that is configured to receive the adjustment screw. The second adjustable protrusion is formed by the adjustment screw.

Notably, the first and second adjusting units may be made in different sizes depending on the size of the STAT.

In some embodiments, the STAT further includes a long level or a long straight edge that is configured to be coupled to the sheave/sprocket of the motor or the sheave/sprocket of the application machine to detect misalignment. The long level or the long straight edge has a length that is longer than a distance between the sheave/sprocket of the motor and the sheave/sprocket of the application machine. When a misalignment is detected, the STAT may then be used to adjust or further adjust the position of the motor foot until the long level or the long straight edge indicates that the sheaves/sprockets are in alignment.

The principles described herein also include methods for using one or more above-described STATs for aligning a sheave/sprocket of a motor and a sheave/sprocket of an application machine. The method includes inserting a security unit of a first STAT into a first elongated aperture of a mounting base of the motor. A first motor foot is slidably fixed on the motor mounting base along the first elongated aperture. The method also includes adjusting a first adjusting unit and/or a second adjusting unit of the first STAT to wedge the first STAT between the first motor foot and an end edge of the first elongated aperture. The first adjustable protrusion of the first adjusting unit of the first STAT is then increased in the first direction to push the first motor foot to slide along the first elongated aperture against the first protrusion of the first STAT. In some embodiments, the first motor foot is positioned at a corner of the motor that is close to the sheave/sprocket of the motor and close to the application machine.

In some embodiments, the method may also include inserting a security unit of a second STAT into a second elongated aperture of the mounting base of the motor. A second motor foot is slidably fixed onto the motor mounting base along the second elongated aperture. The first motor foot and the second motor foot are diagonal to each other. The method may also include adjusting a first adjusting unit and/or a second adjusting unit of the second STAT to wedge the second STAT between the second motor foot and an end edge of the second elongated aperture. The first adjustable protrusion of the first adjusting unit of the second STAT is then increased to push the second motor foot to slide along the second elongated aperture against the first protrusion of the second STAT. In some embodiments, the first motor foot is positioned at a corner of the motor that is close to the sheave/sprocket of the motor and close to the application machine, and the second motor foot is positioned at a corner of the motor that is far from the sheave/sprocket and far from the application machine.

In some embodiments, a long level or a long straight edge is coupled onto one of the sheaves/sprockets of the motor or application machine to emit a laser light beam from one sheave/sprocket to the other sheave/sprocket to identify misalignment of the sheaves/sprockets of the motor and the application machine. The long level or the long straight edge is longer than a distance between the sheaves/sprockets of the motor and the application machine. The first and/or the second STATs may be adjusted repeatedly until the long level or the long straight edge indicates that the two sheaves/sprockets are in alignment with each other.

Similarly, the STAT(s) can also be used to adjust the tension of the belt or chain that connects the sheaves/sprockets of the motor or application machine. To increase the tension, the STAT can move the motor further away from the application machine; and to decrease the tension, the STAT can move the motor closer to the application machine.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 4A illustrates a side view of a motor foot, a motor mounting base, and a STAT that is inserted into an elongated aperture of the motor mounting base;

FIG. 4B illustrates a top view of the motor foot, the motor mounting base, and the STAT in FIG. 4A;

DETAILED DESCRIPTION

The embodiments described herein are related to a sheave and sprocket tension and alignment tool (hereinafter also called STAT) that is configured to be attached to a motor mounting base to assist in adjusting the alignment of a motor connected by drive belts or chains to an application machine.

A motor includes one or more motor feet. A motor mounting base includes one or more elongated apertures. Each of the one or more elongated apertures has an aperture width and an aperture length. The aperture length is substantially greater than the aperture width. Each of the one or more motor feet is slidably fixed onto the motor mounting base, slidable along one of the one or more apertures.

Figure 1B:
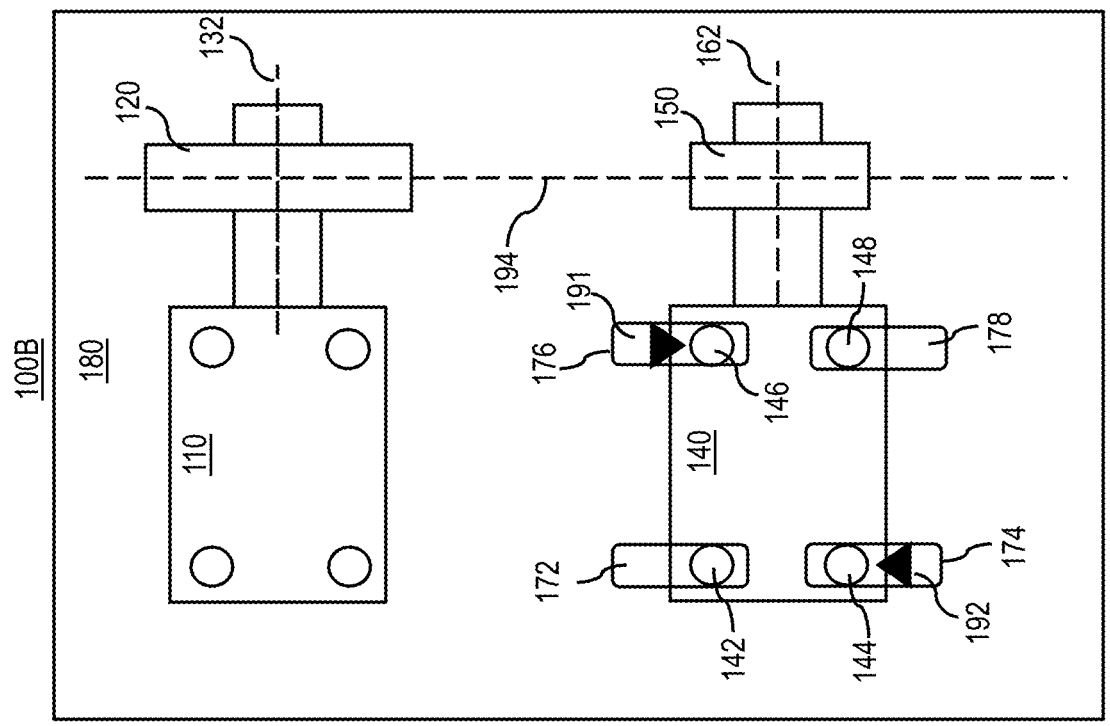
FIG. 1B illustrates an example environment, in which one or more STATs are used to align the sheaves/sprockets of the motor and the application machine.
Figure 1A:
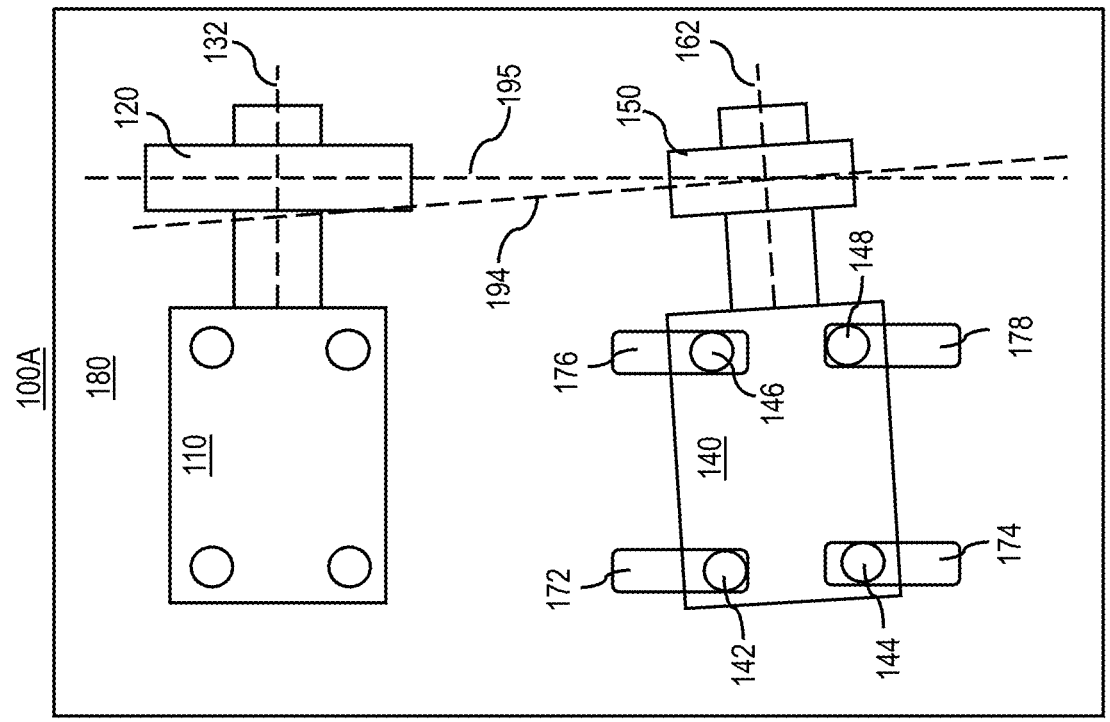
FIG. 1A illustrates an example environment, in which the sheaves/sprockets of a motor and an application machine are not in alignment.

FIG. 1A illustrates an example environment 100A, in which the embodiment described herein may be implemented. FIG. 1A illustrates that an application machine 110 is powered by a motor 140. The motor 140 and the application machine 110 are both mounted onto a motor mounting base 180. A sheave/sprocket 150 is coupled to the motor, and a sheave/sprocket 120 is coupled to the application machine 110. The two sheaves/sprockets are connected via a belt or chain (not shown), such that power can be transmitted from the motor 140 to the application machine 110.

As illustrated in FIG. 1A, the rotation axis 132 of the sheave/sprocket 120 and the rotation axis 162 of the sheave/sprocket 150 are not parallel to each other, which causes the sheaves/sprockets 120 and 150 to be misaligned. Misalignment can cause one or more of the following undesirable conditions: (1) premature belt or chain failure, (2) uneven and premature sheave/sprocket wear, (3) a high operating temperature or energy consumption, (4) uneven wear on a belt or chain sidewall, (5) belt or chain rolling over in the sheave/sprocket groove, (6) transfer of load to one side of the belt or chain, (7) increased probability of vibration, and/or (8) drive instability. Thus, when misalignment occurs, alignment adjustment is required.

Misalignment may be detected using a long level or a long straight edge. For example, the laser long level may be attached to the sheave/sprocket 150 of the motor 140 and extend from the sheave/sprocket 150 of the motor 140 to the sheave/sprocket 120 of the application machine 110 (along the line 194) to identify any misalignment. Alternatively, or in addition, the long level or the long straight edge may also be coupled to the sheave/sprocket 120 of the application machine 110, extending along the line 195 to detect the misalignment. It is preferred that the long level or the long straight edge is longer than the distance between the sheaves/sprockets 150 and 120. Such a level or straight edge may be more rigid, by comparison to the belt or chain extending between sheaves/sprockets 150 and 120, easily indicating to the user that there is misalignment.

When a misalignment is detected, alignment adjustment is required. To adjust the alignment, a position of the motor 140 and/or the application machine 110 needs to be adjusted, which is often achieved by sliding the feet of the motor 140 and/or the application machine through elongated apertures. As illustrated in FIG. 1A, the motor 140 includes multiple feet 142, 144, 146, and 148. The mounting base 180 includes multiple elongated apertures 172, 174, 176, and 178. Each of the motor feet 142, 144, 146, and 148 is slidably mounted onto the motor mounting base 180 along one of the multiple elongated apertures 172, 174, 176, and 178. As such, the position of the motor 140 can be adjusted by sliding one or more feet 142, 144, 146, 148 along the corresponding elongated apertures 172, 174, 176, or 178 to adjust the alignment of the sheaves/sprockets 120 and 150 and/or adjust the tension of the belt or chain connecting the sheaves/sprockets 120 and 150.

Because the motor 140 or the application machine 110 may be heavy, the tension between the two sheaves/sprockets 120 and 150 may be strong, and in some cases, the motor feet 142, 144, 146, and 148 or the elongated apertures 172, 174, 176, and 178 may be rusted, it can be hard to make proper adjustment to the motor 140 or the application machine 110. Also, it may require multiple technicians to adjust the position of the motor 140 or the relative positions of the motor 140 and the application machine 110.

The STATs described herein solve the above-mentioned problem and allow a single user to easily and accurately adjust the relative positions of the motor 140 and the application machine 110. FIG. 1B illustrates the general principle of how the STAT(s) may be used to adjust the position of the motor 140.

As illustrated in FIG. 1B, one or two STATs 191 and/or 192 may be inserted into one or two of the multiple elongated apertures 172, 174, 176, 178. For example, one STAT 191 or 192 may be inserted into the elongated aperture 174 or 176 to push the corresponding motor foot 144 or 146 towards an end of the corresponding elongated aperture 174 or 176. Alternatively, two STATs 191 and 192 may be inserted into two elongated apertures 172 and 178 at the two diagonal corners. Each of the STATs 191 and 192 is configured to push the corresponding motor foot 144 and 146 in an opposite direction. When a certain small particular adjustment is required, one STAT 191 or 192 may be sufficient to achieve the goal. When a greater amount of adjustment is required, two or more STAT 191 and 192 may be necessary. A single user may use the STATs 191 and/or 192 to easily adjust the position of the motor 140 to cause the rotation axis 132 of the sheave/sprocket 120 and the rotation axis 162 of the sheave/sprocket 150 to be parallel to each other.

Even though the STATs can be used at any one of the motor mounting feet, it is advantageous to use one STAT 191 at a corner 146 that is close to the sheave/sprocket 150 and close to the application machine 110, and use another STAT 192 at a corner 144 that is far from the sheave/sprocket 150 and far from the application machine 110. When a belt or a chain is placed on the sheaves/sprockets 120 and 150, sheave/sprocket 150 of the motor 140 is pulled by the belt or sprocket toward the application machine. Thus, applying a first STAT 191 at the corner 146 (that is close to the sheave/sprocket 150 and close to the application machine 110) and applying a second STAT 192 at the diagonal corner can efficiently balance the pulling force generated by the belt or the chain.

Figure 2A:
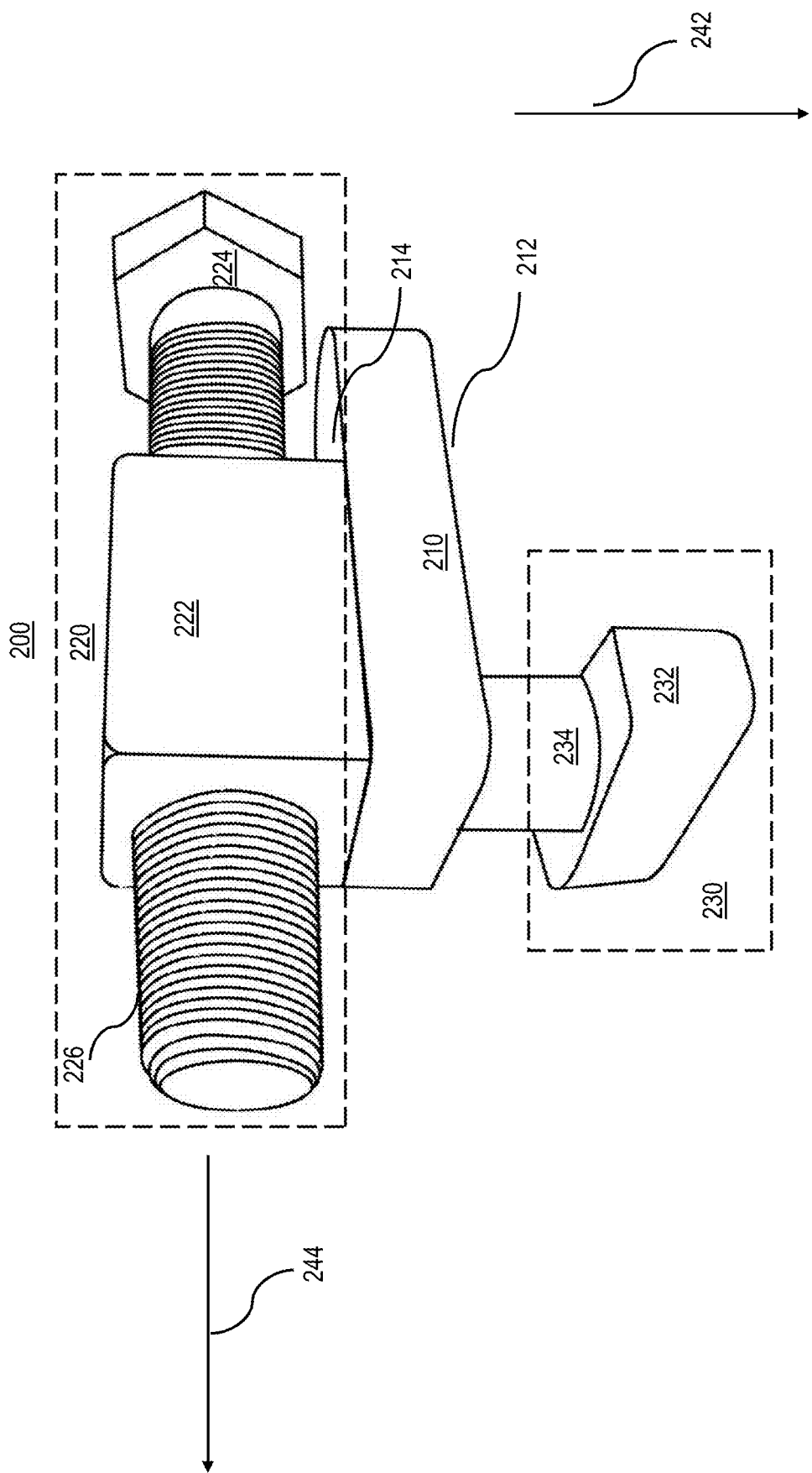
FIG. 2A illustrates an example embodiment of STAT.
Figure 2C:
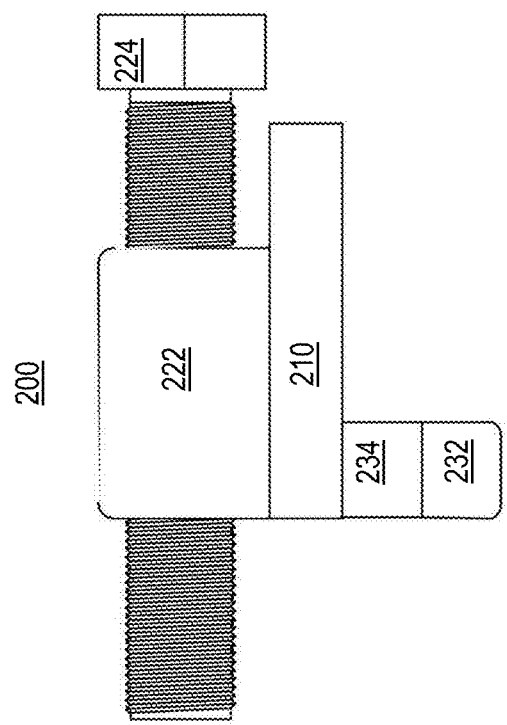
FIG. 2C illustrates a side view of the STAT in FIG. 2A.
Figure 2B:
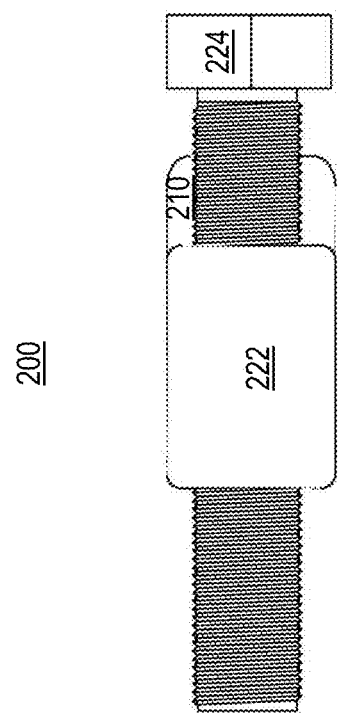
FIG. 2B illustrates a top view of the STAT in FIG. 2A.

FIG. 2A illustrates an example embodiment of STAT 200, which may correspond to the STAT 191 or 192 of FIG. 1B. FIG. 2B illustrates a top view of the STAT 200, and FIG. 2C illustrates a side view of the STAT 200. The STAT 200 includes a plate 210, a securing unit 230 (FIG. 2A), and an adjusting unit 220 (also referred to as a first adjustment unit 220, as shown in FIG. 2A). The plate 210 has a first side 212 and a second side 214, each of which is on an opposite side of a plane of the plate 210. The securing unit 230 is coupled to the first side 212 of the plate 210 and protrudes in a first direction 242 from the first side 212 of the plate 210. The first direction 242 intersects the plane of the plate. The securing unit 230 includes a neck portion 234 and an end portion 232. The neck portion 234 connects the plate 210 and the end portion 232. The adjusting unit 220 is coupled to the second side 214 of the plate 210. The adjusting unit includes an adjustable protrusion 226 that is configured to adjustably protrude in a second direction 244. The second direction is substantially parallel to the plane of the plate 210.

In some embodiments, the adjusting unit 220 includes a receptacle 222 and an insertion unit 224. The receptacle 222 is configured to receive the insertion unit 224, and the insertion unit is configured to form the adjustable protrusion 226 in the second direction 244. In some embodiments, the insertion unit 224 includes a threaded bolt, and the receptacle 222 includes a threaded aperture. The threaded bolt is configured to be screwed into or out of the threaded aperture to adjust the distance of protrusion of an end of the threaded bolt.

Figure 2E:
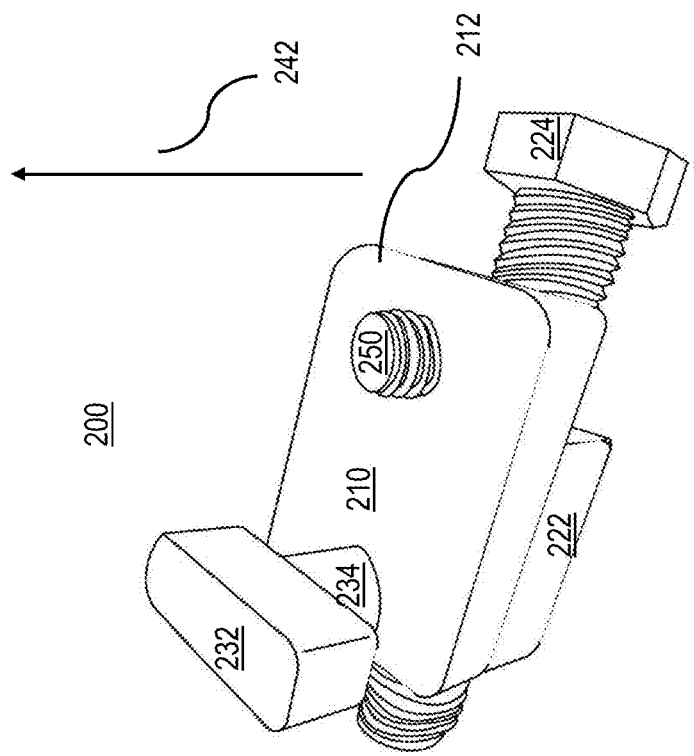
FIG. 2E illustrates the bottom perspective view of the STAT in FIG. 2A, in which the second securing unit is in a protruding state.
Figure 2D:
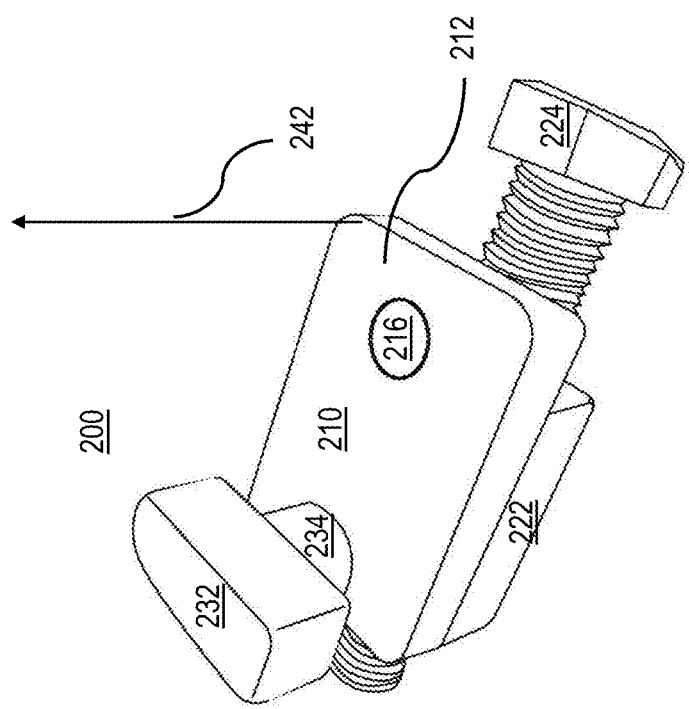
FIG. 2D illustrates a bottom perspective view of the STAT in FIG. 2A, which includes a second securing unit that is in a retracted state.

In some embodiments, the STAT 200 may also include a second adjusting unit that is coupled to the first side 212 of the plate 210. FIGS. 2D and 2E illustrate a bottom view of the STAT 200 that includes the second adjusting unit 250. The second adjusting unit 250 has a second adjustable protrusion that is configured to adjustably protrude from the first side 212 of the plate 210. The second adjustable protrusion is configured to adjustably protrude from the first side 212 of the plate 210. In some embodiments, the second adjusting unit 250 includes an adjustment screw. The plate 210 has a threaded aperture 216 that is configured to receive the adjustment screw. The second adjustable protrusion is formed by the adjustment screw. As illustrated in FIG. 2D, the adjustment screw 250 is retracted into the threaded aperture 216. On the other hand, as illustrated in FIG. 2E, the adjustment screw 250 is adjusted to protrude from the first side 212 of the plate 210.

As illustrated in FIGS. 2A through 2E, it is advantageous to have three sides of the neck portion 234 of the securing unit 230, the receptacle 222 of the adjusting unit 220, and the plate 210 to be flush with each other. For example, when the neck portion 234 and the receptacle 222 is flush with the end 212 of the plate 210, the STAT 200 can be inserted into a smaller space of an elongated aperture of the motor mounting base. Also, it is easier to manufacture when many sides of the STATs are flush. Further, having the surfaces of these different portions of the STAT to be flush with each other also causes the shape of STAT to be more symmetric or even, thus it is easier to store or carry around.

FIGS. 2A through 2D merely illustrate one example embodiment of STAT 200. Other modified embodiments may also be implemented to achieve the same or similar purposes.

Figure 3B:
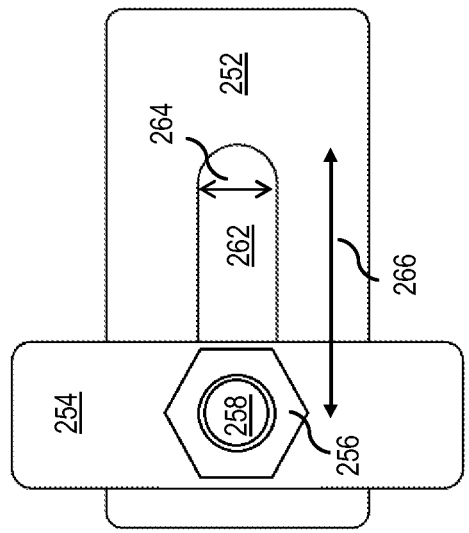
FIG. 3B illustrates a top view of the example motor foot and the portion of the example motor mounting base in FIG. 3A.
Figure 3A:
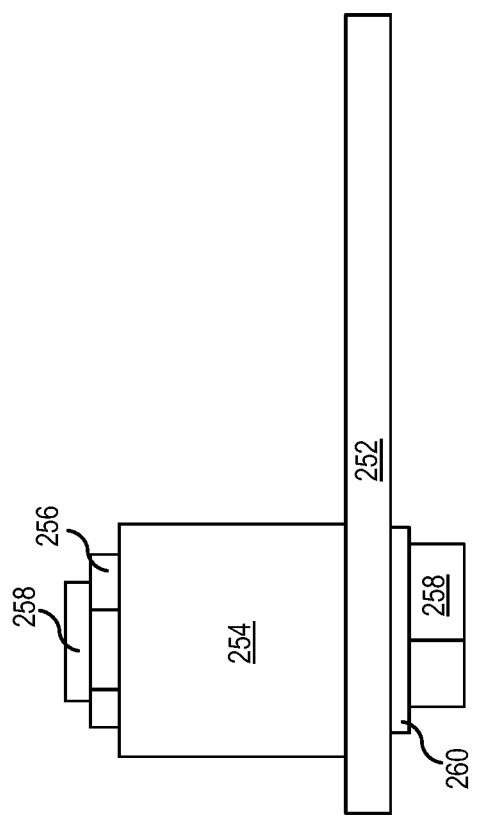
FIG. 3A illustrates a side view of an example motor foot and a portion of an example motor mounting base.

After describing the example embodiments of STAT, we will now describe how the STAT 200 may be used to adjust the tension and/or the alignment of sheaves/sprockets of a motor and an application machine with respect to FIGS. 3A through 3D and 4A through 4F. As briefly described above, the STAT 200 is configured to be inserted into an elongated aperture of a motor mounting base, along which a motor foot is slidably fixed. FIG. 3A illustrates a side view of an example motor foot 254 and a portion of an example motor mounting base 252. FIG. 3B illustrates a top view of the example motor foot 254 and the portion of the example motor mounting base 252. The motor foot 254 may correspond to the motor foot 142, 144, 146, or 148 of FIGS. 1A and 1B; the motor mounting base 252 may correspond to the motor mounting base 180 of FIGS. 1A and 1B. As illustrated in FIGS. 3A and 3B, the motor foot 254 is slidably fixed onto the motor mounting base 252 through an elongated aperture 262. The elongated aperture 262 has an aperture width 264 and an aperture length 266. The aperture length 266 is substantially greater than the aperture width 264. As illustrated in FIGS. 3A and 3B, in some embodiments, the motor foot 254 may be fixed onto the mounting base 252 using a bolt 258, a nut 256, and a washer 260.

Figure 4D:
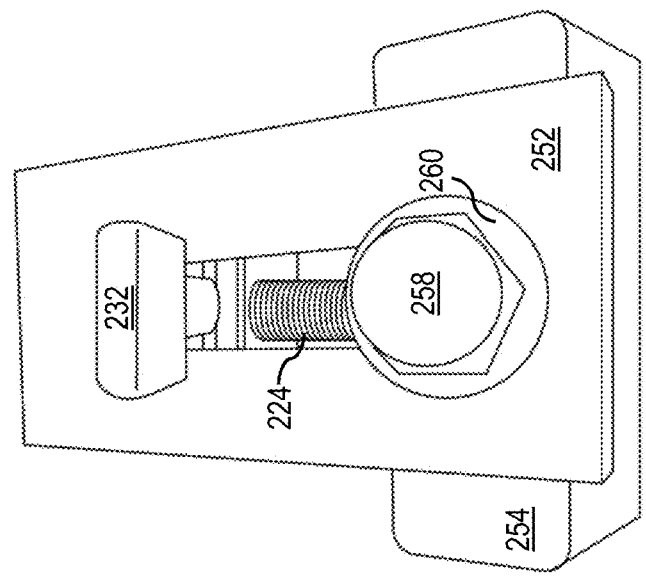
FIGS. 4C and 4D illustrate a bottom perspective view of the motor foot, the motor mounting base, and the STAT in FIG. 4A.
Figure 4C:
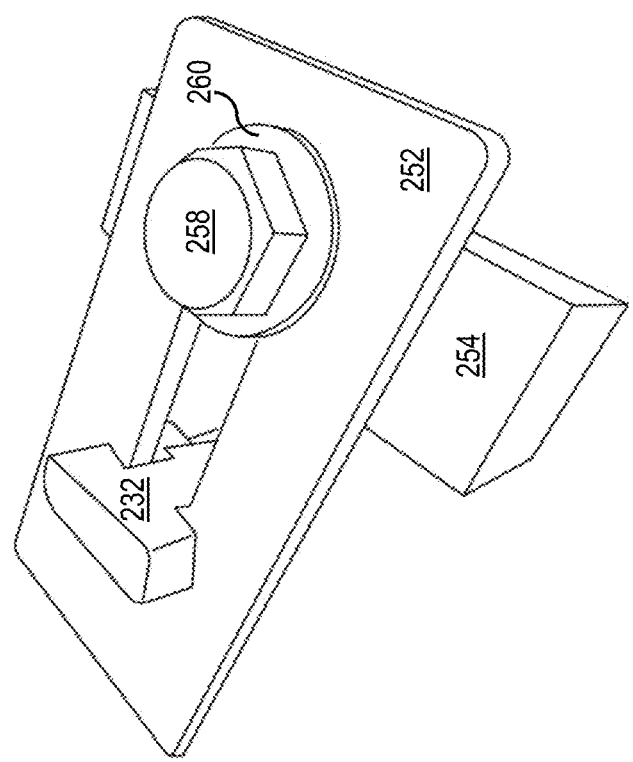

FIGS. 4A through 4D illustrate an example environment 400, in which a STAT 200 is used to adjust a position of a motor foot 254. FIG. 4A illustrates a side view of the motor foot 254, the motor mounting base 252, and the STAT 200; and FIG. 4B illustrates a top view, and FIGS. 4C and 4D illustrate a bottom view thereof. As illustrated in FIGS. 4A through 4D, the securing unit 232 of the STAT 200 is inserted into the elongated aperture 262 of the motor mounting base 252. The neck portion 234 of the security unit has a diameter or a width that is narrower than the aperture width 264. The end portion 232 of the security unit has a wide side and a narrow side. The wide side has a width that is greater than the aperture width 264, but narrower than the aperture length 266. The narrow side has a width that is narrower than the aperture width 264, such that the securing unit 230 can be inserted into the elongated aperture 262 along the wide side of the end portion 232. After the securing unit 230 is inserted into the elongated aperture 262, the securing unit 230 can be rotated and secured at a position where the wide side of the end portion 232 intersects the direction of the aperture length 266. After the securing unit is secured in the elongated aperture 262, the adjustable protrusion 226 of the adjusting unit 220 can be adjusted to further protrude in the second direction 244 to wedge the STAT 200 between the motor foot 254 and an end of the elongated aperture 262, and to apply a force onto the motor foot 254 to cause the motor foot 254 to move along the elongated aperture 262 toward the second direction 244.

Figure 4F:
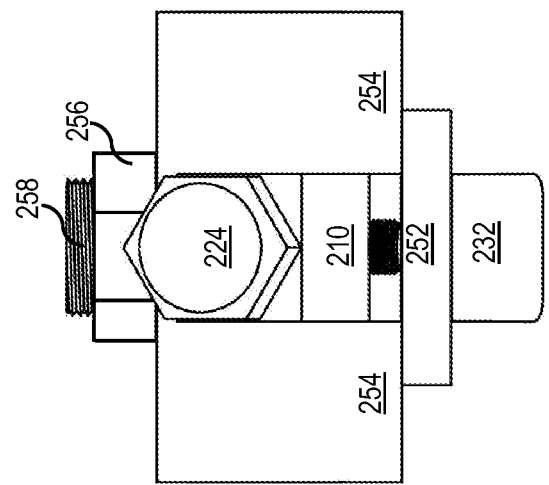
FIGS. 4E and 4F illustrate how a second adjusting unit may be used to adjust a height of a first adjusting unit to fit a height of a motor foot.
Figure 4E:
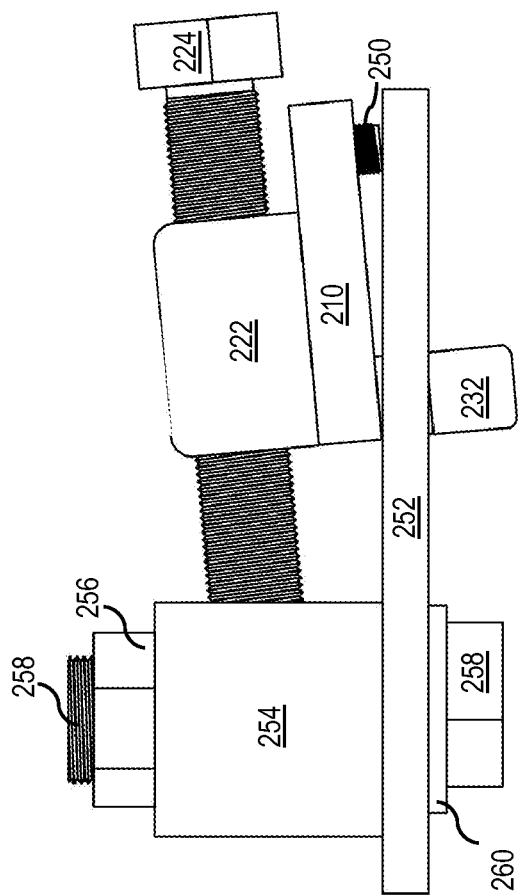

FIGS. 4E and 4F further illustrate how the second adjusting unit 250 may be useful. In some cases, the height of the motor foot 254 may be lower than the height of the first adjusting unit 220, such that the first adjustable protrusion 226 cannot efficiently push against the side of the motor foot 254. As illustrated in FIGS. 4E and 4F, in such a case, the second adjusting unit 250 may be adjusted to protrude from the first side 212 of the plate 210 to cause the plate 210 to tilt to lower the first adjustable protrusion 226 to fit the height of the motor foot 254.

Figure 5A:
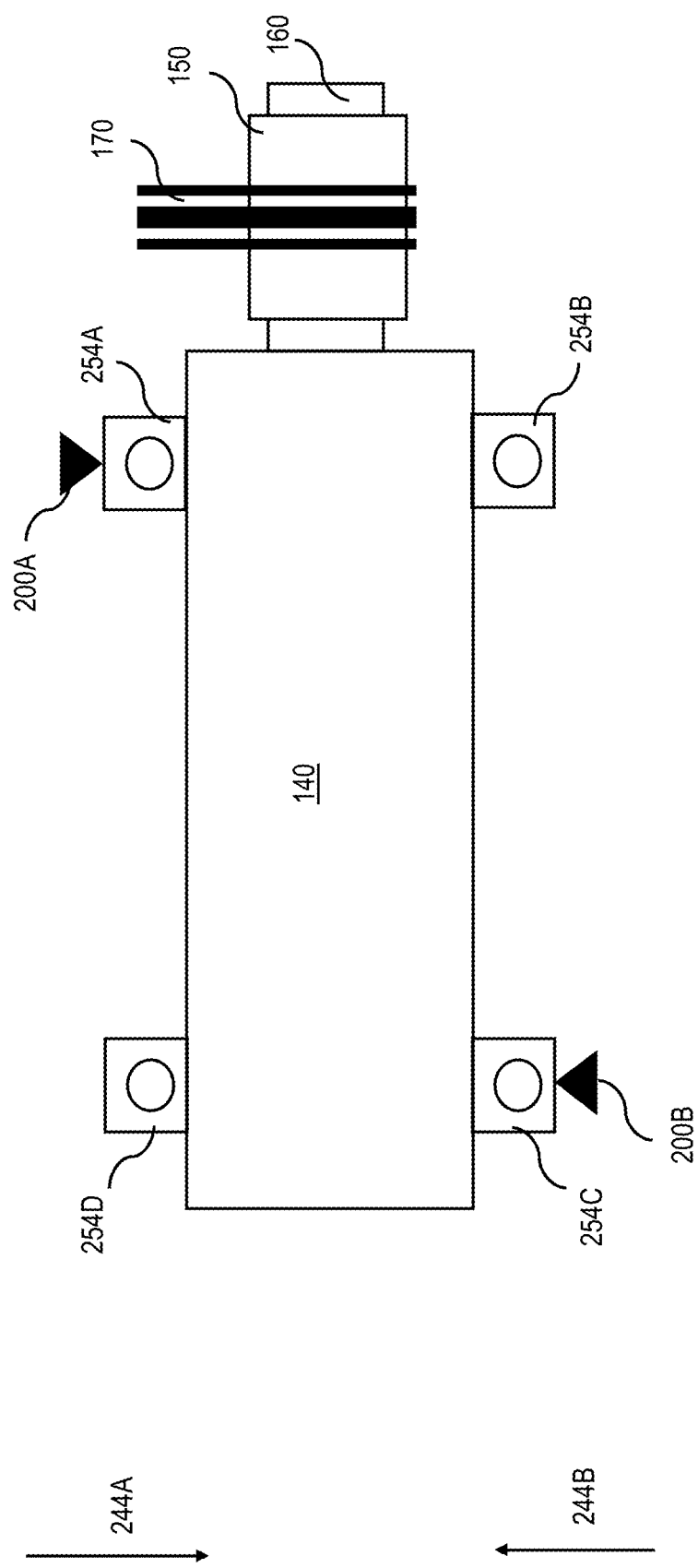
FIG. 5A illustrates a top view of an example motor.
Figure 5C:
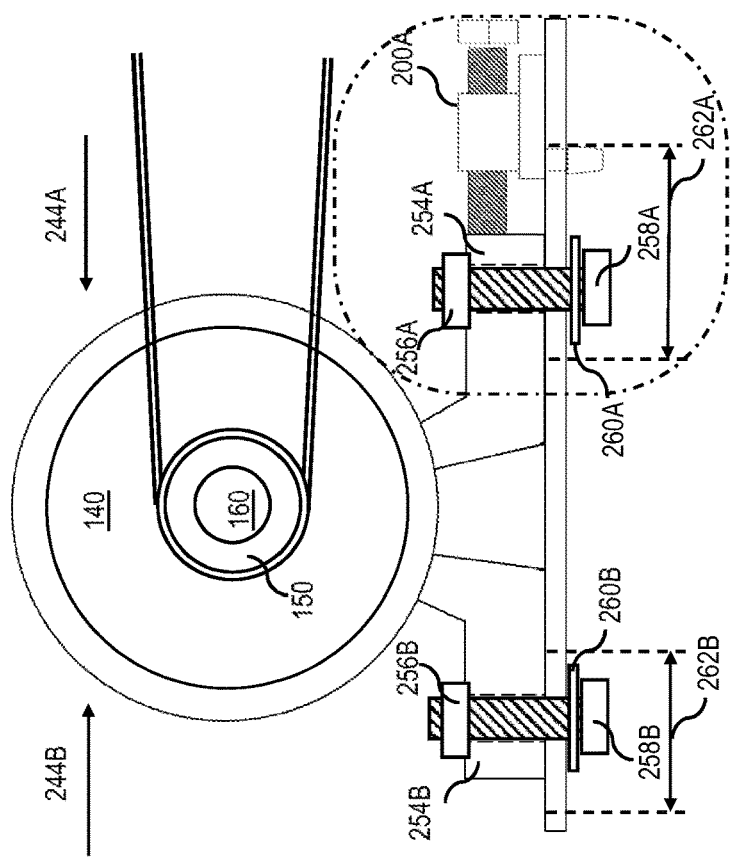
FIGS. 5B and 5C illustrate opposite side views of the example motor in FIG. 5A.
Figure 5B:
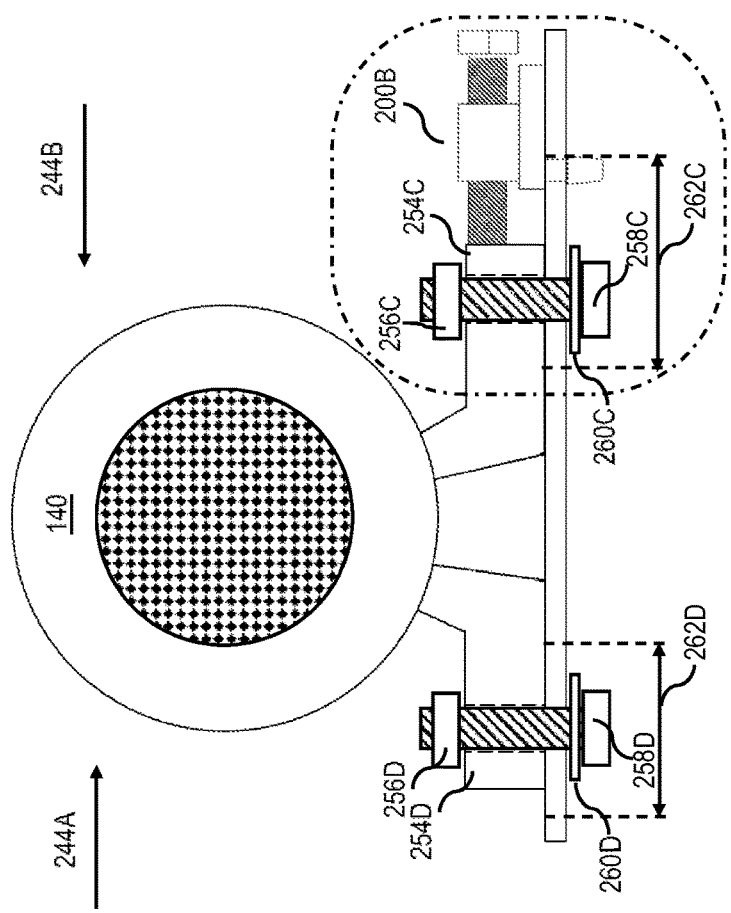

FIGS. 5A through 5C further illustrate different views of the example motor 140 that has multiple motor feet 254A, 254B, 254C, and 254D. FIG. 5A illustrates a top view of the motor 140, and each of FIGS. 5B and 5C illustrate an opposite side view of the motor 140. As illustrated in FIG. 5A, two STAT 200A and 200B are used to adjust the position of the motor 140. The STAT 200A is used to push the motor foot 254A in a direction 244A, and the STAT 200B is used to push the motor foot 254C in a direction 244B that is opposite to the direction 244A, such that the direction of the rotation axis 162 can be adjusted to align the sheave/sprocket 150 of the motor 140 with a sheave/sprocket of an application machine (not shown).

A chain or a belt 170 is used to connect the sheave/sprocket 150 of the motor 140 with the sheave/sprocket of the application machine (not shown in FIG. 5A). Notably, the chain or the belt 170 pulls the sheave/sprocket 150 in the direction of 244B. Thus, it is more efficient to apply a first STAT 200A at the motor mounting feet 254A that is positioned close to the sheave/sprocket 150 and close to the application machine and/or apply a second STAT 200B at the motor mounting feet 254C that is diagonal to the feet 254A.

FIG. 5B illustrates a side view of the motor 140 from a side that is opposite to the sheave/sprocket 150. As illustrated in FIG. 5B, the STAT 200B is inserted into an elongated aperture 262C of the motor mounting base 252 to push the motor foot 254C in the direction 244B, which is opposite to the direction 244A. FIG. 5C illustrates a side view of the motor 140 from the side of the sheave/sprocket 150. As illustrated in FIG. 5C, the STAT 200A is inserted into an elongated aperture 262A of the motor mounting base 252 to push the motor foot 254A in the direction 244A, which is opposite to the direction 244B.

Depending on the relative position of each motor foot 254A through 254D to the corresponding elongated apertures 262A through 262D, and the amount of adjustment that is required, one or more STATs 200 may be used to adjust one or more motor feet 254A through 254D. For example, when only a small amount of adjustment is required, one STAT 200A or 200B may be sufficient to adjust the alignment or tension. When a larger amount of adjustment is required, two STATs 200 may be placed at diagonal corners, such as the motor feet 254C and 254A as illustrated in FIGS. 5A through 5C.

Figure 5D:
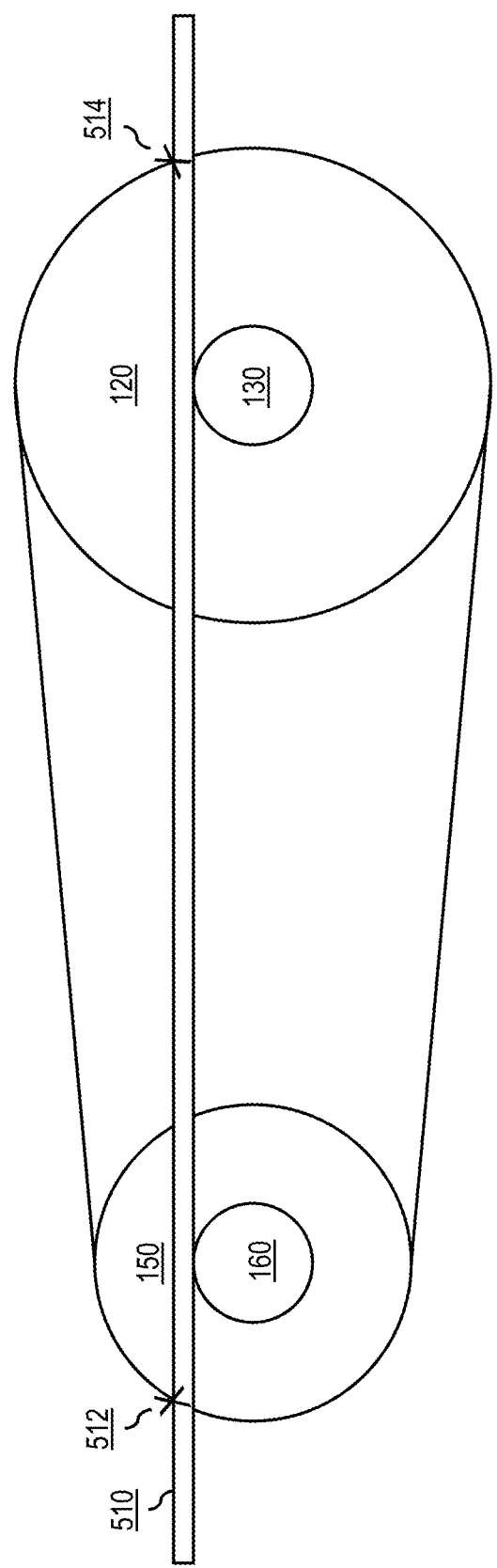
FIGS. 5D and 5E illustrate an example long level or long straight edge being used to detect misalignment.
Figure 5E:
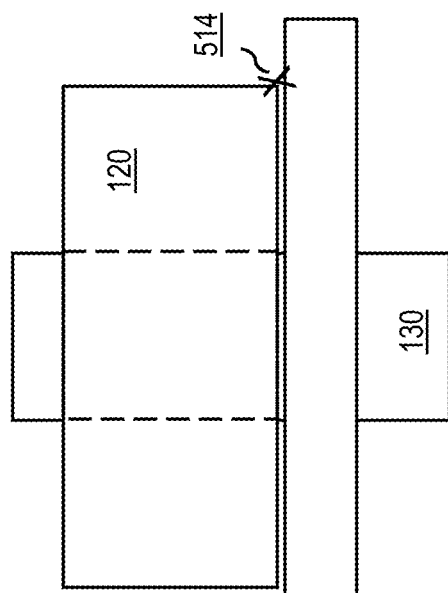
Figure 5E:
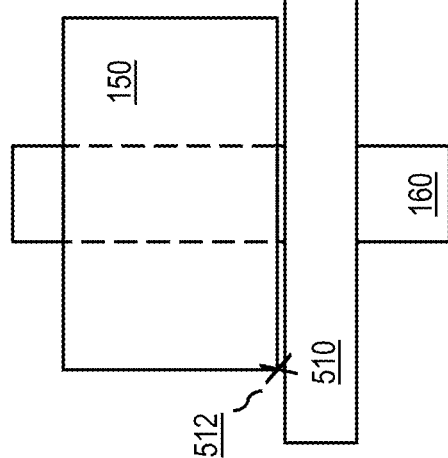

FIGS. 5D and 5E illustrate an example long level or long straight edge 510 that is used to detect misalignment. As illustrated in FIGS. 5D and 5E, the long level or long straight edge 510 is placed on top of a rotation shaft 160 of the motor 140 and a rotation shaft 130 of the application machine 120. It is advantageous that the length of the long level or long straight edge 510 is greater than the distance between the two rotation shafts 160 and 130. In particular, it is preferred that each end of the long level or long straight edge 510 passes beyond the edges of the sheaves 150 and 120 at points 512, 514.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
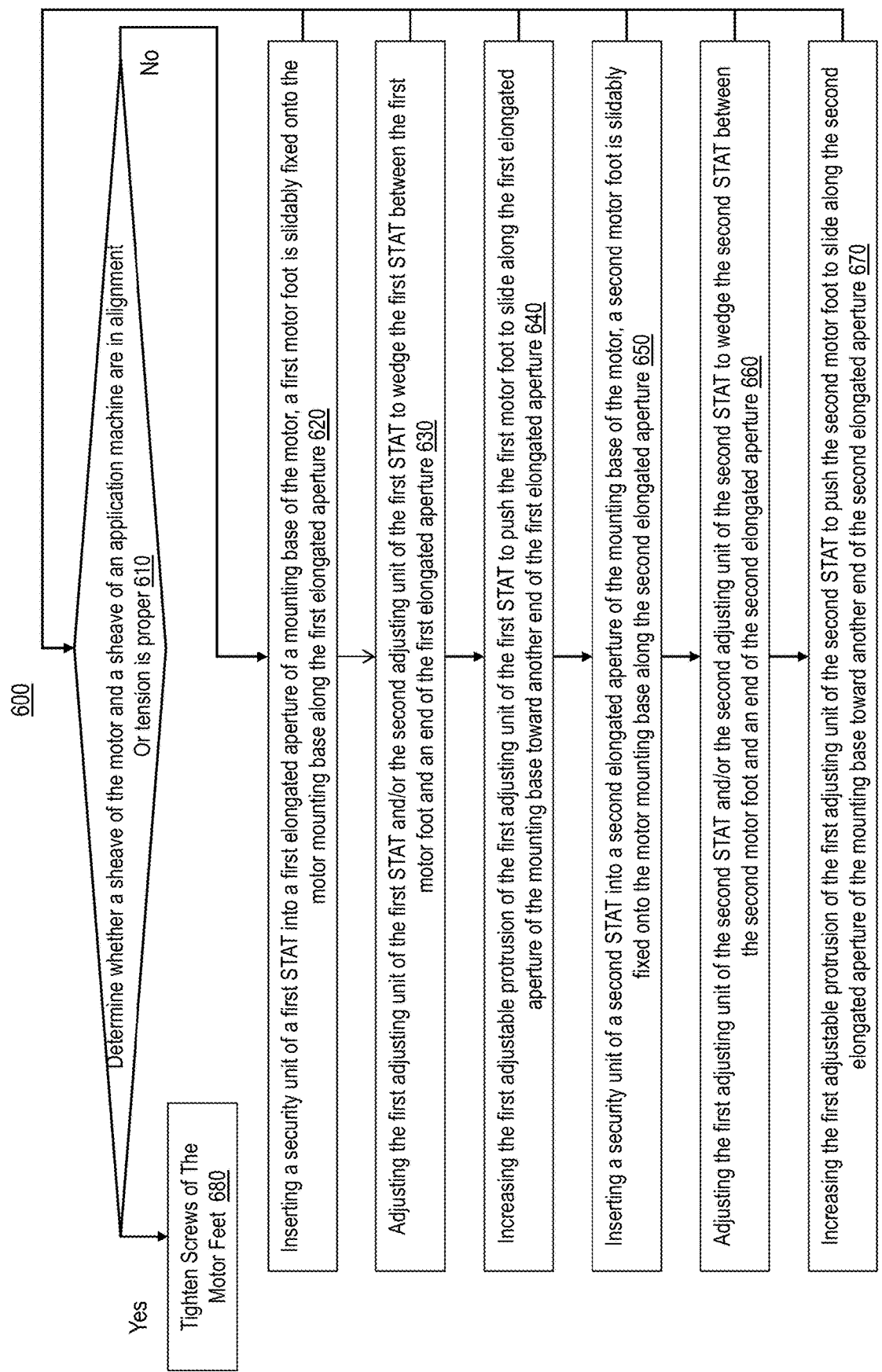
FIG. 6 illustrates a flowchart of an example method for using one or more STATs to adjust the alignment of sheaves/sprockets of a motor and an application machine.

FIG. 6 illustrates a flowchart of an example method 600 for using one or more STATs to adjust the alignment of sheaves/sprockets of a motor and an application machine. The method 600 may include determining whether a sheave/sprocket of the motor and a sheave/sprocket of an application machine are in alignment, or whether the tension is proper (610). Determining whether the sheaves/sprockets are in alignment may be achieved by using a long level or a long straight edge. When the sheaves/sprockets are not in alignment, or the tension is not proper, an adjustment is required.

The process of adjustment includes inserting a security unit of a first STAT into a first elongated aperture of a mounting base of the motor (620). A first motor foot is slidably fixed onto the motor mounting base along the first elongated aperture. The method 600 also includes adjusting the first adjusting unit of the first STAT and/or the second adjusting unit of the first STAT to wedge the first STAT between the first motor foot and the first elongated aperture (630). The method 600 also includes further increasing the first adjustable protrusion of the first adjusting unit of the first STAT to push the first motor foot to slide along the first aperture of the mounting base toward another end of the first aperture (640). It is advantageous to place the first STAT at a corner that is close to the sheave/sprocket of the motor and close to the application machine like the STAT 191, 192 of FIGS. 1A and 1B or the STAT 200A of FIGS. 5A through 5C.

In some embodiments, the method 600 may also include inserting a security unit of a second STAT into a second elongated aperture of the mounting base of the motor (650). A second motor foot is slidably fixed onto the motor mounting base along the second elongated aperture. The method 600 may also include adjusting the first adjusting unit of the second STAT and/or the second adjusting unit of the second STAT to wedge the second STAT between the second motor foot and an end of the second elongated aperture (660). The method 600 may also include increasing the first adjustable protrusion of the first adjusting unit of the second STAT to push the second motor foot to slide along the second elongated aperture of the mounting base toward another end of the second aperture (670). It is preferred that the first motor foot and the second motor foot are diagonal to each other. Specifically, it is preferred that the first STAT is placed at a corner of the motor that is closer to the sheave/sprocket of the motor and closer to the application machine, and the second STAT is placed at a corner of the motor that is further to the sheave/sprocket of the motor and further to the application machine.

The determining whether the sheave/sprocket of the motor and the sheave/sprocket of the application machine are in alignment or the tension is proper may be performed after each adjustment of using the first STAT and/or second STAT. This process may be repeated until the sheaves/sprockets are in alignment and the tension is proper. When it is determined that the sheaves/sprockets are in alignment and the tension is proper, the user can then tighten the screws of the motor feet to fix the motor feet at the adjusted positions (680). The STATs can then be removed from the motor mounting base.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sheave or sprocket tension adjustment and alignment tool (STAT) for adjusting alignment between a sheave/sprocket of the motor and a sheave/sprocket of an application machine, the motor being adjustably mounted on a motor mounting base, the motor mounting base comprising one or more elongated apertures, each of which has an aperture width and an aperture length, the aperture length being substantially greater than the aperture width, the motor having one or more motor feet, and each of the one or more motor feet is slidably fixed onto the motor mounting base and slidable along one of the one or more elongated apertures, the STAT comprising:

a plate having a first side and a second side, each of which is on an opposite side of a plane of the plate;

a securing unit that is coupled to the first side of the plate and protrudes in a first direction from the first side of the plate to be inserted into one of the one or more elongated apertures of the motor mounting base, the first direction intersects the plane of the plate; and an adjusting unit that is coupled to the second side of the plate, the adjusting unit comprising an adjustable protrusion that is configured to adjustably protrude in a second direction, the second direction is substantially parallel to the plane of the plate, wherein after the securing unit is inserted into the elongated aperture of the motor mounting base, the adjustable protrusion of the adjusting unit is adjustable to further protrude in the second direction to wedge the STAT between the corresponding motor foot and an end of the elongated aperture, and to apply a force onto the corresponding motor foot to cause the motor foot to move along the elongated aperture toward the second direction.

2. The STAT of claim 1, wherein the plate has a width that is greater than the aperture width, such that the plate is held against the motor mounting base when the securing unit is inserted into the elongated aperture.

3. The STAT of claim 2, wherein:
the securing unit has a neck portion and an end portion,
the neck portion connects the plate and the end portion, the neck portion having a diameter or width that is narrower than the aperture width,
the end portion has a wide side and a narrow side,
the wide side has a width that is greater than the aperture width, but narrower than the aperture length,
the narrow side has a width that is narrower than the aperture width, such that the securing unit is configured to be inserted into the elongated aperture along the wide side of the end portion,
wherein when the neck portion is in the elongated aperture, the securing unit is configured to be rotated and secured at a position where the wide side of the end portion intersects a direction of the aperture length.

4. The STAT of claim 1, wherein the adjusting unit includes a receptacle and an insertion unit, the receptacle is configured to receive the insertion unit, and the insertion unit is configured to form the adjustable protrusion in the second direction.

5. The STAT of claim 4, wherein the insertion unit includes a threaded bolt, the receptacle includes a threaded aperture, and the threaded bolt is configured to be screwed into or out of the threaded aperture to adjust a distance of protrusion of an end of the threaded bolt.

6. The STAT of claim 1, wherein:
the adjusting unit is a first adjusting unit,
the adjustable protrusion of the first adjusting unit is a first adjustable protrusion,
the STAT further comprises a second adjusting unit that is coupled to the first side of the plate and has a second adjustable protrusion that is configured to adjustably protrude from the first side of the plate.

7. The STAT of claim 6, wherein when the securing unit is inserted into the elongated aperture, the second adjustable protrusion is configured to be adjusted to protrude and against the motor mounting base to cause the plate and the first adjustable protrusion to tilt at a proper angle to fit a height of the motor foot.

8. The STAT of claim 7, wherein:
the second adjusting unit includes an adjustment screw,
the plate has a threaded aperture that is configured to receive the adjustment screw, and
the second adjustable protrusion is formed by the adjustment screw.

9. The STAT of claim 6, further comprising a long level or a long straight edge that is longer than a distance between the sheave/sprocket of the motor and the sheave/sprocket of the application machine to detect misalignment, the long level or the long straight edge is configured to be coupled to the sheave/sprocket of the motor or the sheave/sprocket of the application machine to detect a misalignment.

10. The STAT of claim 1, further comprising a long level or a long straight edge that is longer than a distance between the sheave/sprocket of the motor and the sheave/sprocket of the application machine to detect misalignment, the long level or the long straight edge is configured to be coupled to the sheave/sprocket of the motor or the sheave/sprocket of the application machine to detect a misalignment.

11. A method for aligning a sheave/sprocket of a motor and a sheave/sprocket of an application machine using one or more sheave/sprocket tension and alignment tools (STATs) of claim 1, the method comprising:
inserting a security unit of a first STAT of the one or more STATs into a first elongated aperture of a mounting base of the motor, a first motor foot being slidably fixed onto the motor mounting base along the first elongated aperture;
adjusting an adjusting unit of the first STAT to wedge the first STAT between the first motor foot and an end edge of the first elongated aperture; and
increasing an adjustable protrusion of the adjusting unit of the first STAT to push the first motor foot to slide along the first elongated aperture toward a direction of the adjustable protrusion of the first STAT.

12. The method of claim 11, wherein the first motor foot is positioned at a corner of the motor that is close to the sheave/sprocket of the motor and close to the application machine.

13. The method of claim 11, further comprising:
inserting a security unit of a second STAT of the one or more STATs into a second elongated aperture of the mounting base of the motor, a second motor foot being slidably fixed onto the motor mounting base along the second elongated aperture, the first motor foot and the second motor foot being diagonal to each other;
adjusting an adjusting unit of the second STAT to wedge the second STAT between the second motor foot and an end edge of the second elongated aperture; and
increasing an adjustable protrusion of the adjusting unit of the second STAT to push the second motor foot to slide along the second elongated aperture toward a direction of the adjustable protrusion of the second STAT.

14. The method of claim 13, wherein:
the first motor foot is positioned at a corner of the motor that is close to the sheave/sprocket of the motor and close to the application machine; and
the second motor foot is positioned at a corner of the motor that is far from the sheave/sprocket of the motor and far from the application machine.

15. A method for aligning a sheave/sprocket of a motor and a sheave/sprocket of an application machine using one or more sheave/sprocket tension and alignment tools (STATs) of claim 6, the method comprising:
inserting a security unit of a first STAT of the one or more STATs into a first elongated aperture of a mounting base of the motor, a first motor foot being slidably fixed onto the motor mounting base along the first elongated aperture;
adjusting at least one of (1) a first adjusting unit or (2) a second adjusting unit of the first STAT to wedge the first STAT between the first motor foot and an end edge of the first elongated aperture; and
increasing a first adjustable protrusion of the first adjusting unit of the first STAT to push the first motor foot to slide along the first elongated aperture toward a direction of the first adjustable protrusion of the first STAT.

16. The method of claim 15, wherein the first motor foot is positioned at a corner of the motor that is close to the sheave/sprocket of the motor and close to the application machine.

17. The method of claim 15, the method comprising:
inserting a security unit of a second STAT of the one or more STATs into a second elongated aperture of the mounting base of the motor, a second motor foot being slidably fixed onto the motor mounting base along the second elongated aperture, the first motor foot and the second motor foot being diagonal to each other;
adjusting at least one of (1) a first adjusting unit or (2) a second adjusting unit of the second STAT to wedge the second STAT between the second motor foot and an end edge of the second elongated aperture; and
increasing a first adjustable protrusion of the first adjusting unit of the second STAT to push the second motor foot to slide along the second elongated aperture toward a direction of the first adjustable protrusion of the second STAT.

18. The method of claim 17, wherein:
the first motor foot is positioned at a corner of the motor that is close to the sheave/sprocket of the motor and close to the application machine; and
the second motor foot is positioned at a corner of the motor that is far from the sheave/sprocket of the motor and far from the application machine.

19. A method for aligning a sheave/sprocket of a motor and a sheave/sprocket of an application machine using one or more sheave/sprocket tension and alignment tools (STATs) of claim 9, the method comprising:
attaching the long level or the long straight edge of a first STAT of the one or more STATs to the sheave/sprocket of the motor or the sheave/sprocket of the application machine to detect a misalignment;
in response to detecting the misalignment,
  inserting a security unit of the first STAT into a first elongated aperture of a mounting base of the motor, a first motor foot being slidably fixed onto the motor mounting base along the first elongated aperture;
  adjusting an adjusting unit of the first STAT to wedge the first STAT between the first motor foot and an end edge of the first elongated aperture; and
  increasing an adjustable protrusion of the adjusting unit of the first STAT to push the first motor foot to slide along the first elongated aperture toward a direction of the adjustable protrusion of the first STAT.

20. The method of claim 19, further comprising:
inserting a security unit of a second STAT of the one or more STATs into a second elongated aperture of the mounting base of the motor, a second motor foot being slidably fixed onto the motor mounting base along the second elongated aperture;
adjusting an adjusting unit of the second STAT to wedge the second STAT between the second motor foot and an end edge of the second elongated aperture; and
increasing an adjustable protrusion of the adjusting unit of the second STAT to push the second motor foot to slide along the second elongated aperture toward a direction of the adjustable protrusion of the second STAT,
wherein:
  the first motor foot is positioned at a corner of the motor that is close to the sheave/sprocket of the motor and close to the application machine; and
  the second motor foot is positioned at a corner of the motor that is far from the sheave/sprocket of the motor and far from the application machine.

* * * * *